(Model.)

2 Sheets—Sheet 1.

E. F. PAYNE.
FISHING REEL.

No. 432,764.

Patented July 22, 1890.

Witnesses:

Inventor:
Edward F. Payne
by his Attorneys
Brown & Griswold (Model.) 2 Sheets—Sheet 2.

E. F. PAYNE.
FISHING REEL.

No. 432,764. Patented July 22, 1890.

Witnesses:
D. H. Haywood
C. Sundgren

Inventor:
Edward F. Payne
by his Attorneys
Brown & Griswold

UNITED STATES PATENT OFFICE.

EDWARD F. PAYNE, OF CENTRAL VALLEY, ASSIGNOR TO THOMAS B. MILLS, OF NEW YORK, N. Y.

FISHING-REEL.

SPECIFICATION forming part of Letters Patent No. 432,764, dated July 22, 1890.

Application filed September 14, 1889. Serial No. 323,958. (Model.)

*To all whom it may concern:*

Be it known that I, EDWARD F. PAYNE, of Central Valley, in the county of Orange and State of New York, have invented a certain new and useful Improvement in Fishing-Reels, of which the following is a specification.

My improvement relates to means for producing a drag upon the spool of a fishing-reel, whereby the resistance offered to the unwinding of line wound upon the spool may be varied as desired.

I will describe in detail a fishing-reel embodying my improvement, and then point out the novel features in claims.

Figure 1:
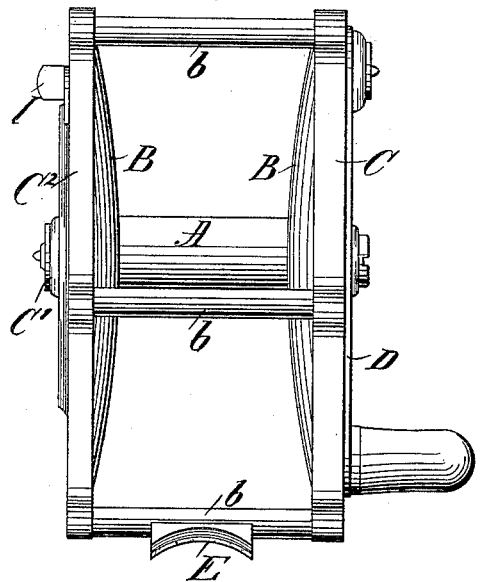
Figure 2:
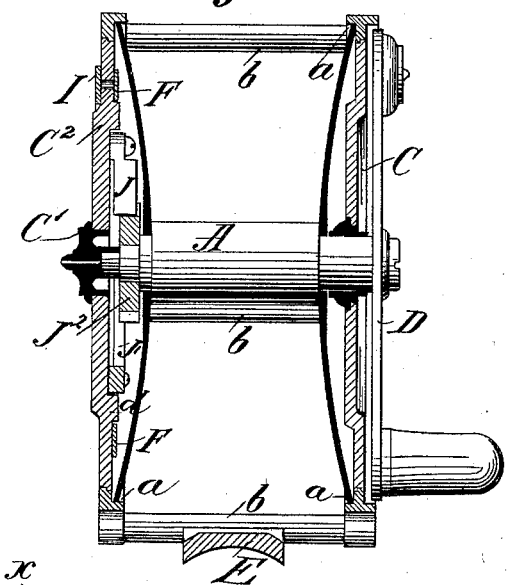
Figure 3:
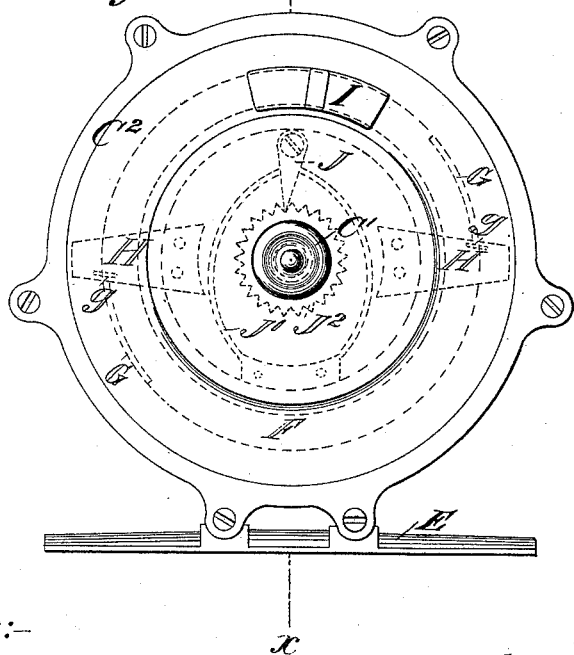
Figure 4:
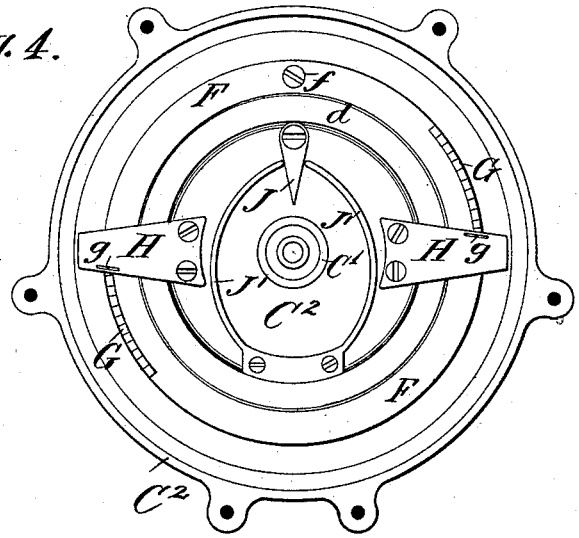
Figure 5:
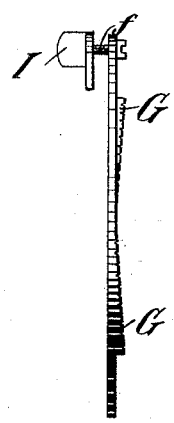
Figure 6:
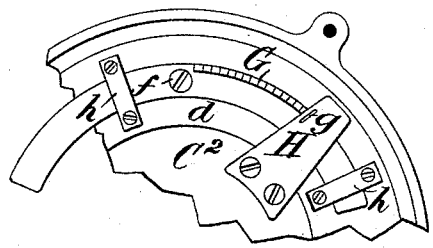

In the accompanying drawings, Figure 1 is a side elevation of a fishing-reel embodying my improvement. Fig. 2 is a vertical section of the same. Fig. 3 is a side elevation of one end of the reel. Fig. 4 is a face view of one of the reel-heads, looking from the inside. Fig. 5 is an edge view of a certain cam-frame which I employ. Fig. 6 is a view of a portion of the the reel-head, showing a slight modification.

Similar letters of reference designate corresponding parts in all the figures.

The spool of the reel comprises a spindle A and heads B, which may be of metal or of other suitable material and of ordinary construction. The spindle A is journaled near one end in a reel-head C and near its other end in a bearing C', secured in the other head, or $C^2$. Upon that portion of the spindle extending through the reel-head C is secured a handle D of ordinary construction, by which the spool may be rotated. The peripheries of the spool-heads B are received in suitable recesses $a$, formed upon the inner sides of the reel-heads C $C^2$. Connecting bars or rods $b$ extend between the reel-heads C $C^2$, and the reel is provided with a plate E, as is usual, by which the same may be secured to a fishing-rod.

It is desirable that a drag should be applied to the spool which may be adjusted so as to vary the degree of pressure which it will exert upon the spool, and consequently vary, as desired, the resistance to the unwinding of the line from the spool. In order to accomplish this, I propose employing a cam which, when caused to act upon the drag, will move the drag into more or less close contact with the head of the spool, and thus increase or decrease the frictional resistance offered by the drag to the rotation of the spool. I have illustrated convenient means for accomplishing this, consisting in the example of my improvement more clearly illustrated in Figs. 3, 4, and 5, of a circular frame F, which may be made of comparatively thin sheet metal. Upon this frame are two cams G. These cams extend at approximate right angles to the face of the frame F, and are curved in this instance to conform to the arc of said frame. They also extend in opposite directions to each other.

The inner surface of the reel-head $C^2$ is provided with an annular raised rim $d$, the external diameter of which is approximately the same as the internal diameter of the frame F. Said frame extends about the rim $d$, and the latter operates as a stop to prevent lateral movement of the frame.

H designate drags, of which I have shown two in this example, but of which I need use but one. When two are used, they will be preferably arranged opposite each other and will extend in opposite directions. Their inner ends are secured, as shown, by means of screws to the reel-head $C^2$. Their outer ends are free and extend over the cams G. When the frame F is rotated, the cams G will force the free end portions of the drags H outwardly, so that said end portions of the drags will bear against the adjacent spool-head B. Of course the greater the rotation of the frame F the tighter will the drags H be forced against the spool-head, for the reason that such rotation causes the cams to force the outer portions of the drags outwardly with a constantly-increasing pressure.

I have shown the upper edges of the cams G as serrated and the under sides of the drags H as provided with teeth $g$, which will engage said serrations when the cams are moved beneath the drags and will serve to maintain the frame F and the cams in a position into which they have been rotated.

I have shown a means for rotating the frame

F and the cams, consisting of a hand-piece I upon the outside of the reel-head C², which hand-piece is provided with a shank $f$, which extends through an arc-shaped slot in said reel-head and engages the ring-frame F.

In the example of my improvement shown in Fig. 6 but one drag and one cam is shown, and the frame F, instead of being annular, consists merely of an arc-shaped piece of metal upon which is the cam G. The frame in this instance extends through loops $h$, which act as guides. The frame and cam are rotated in the same manner as previously described.

Inward of the rim $d$ the reel-head C² is recessed. Within this recess is secured a click consisting of a tooth J, upon opposite sides of which bear springs J' of ordinary construction. When the parts are assembled, the click-tooth J contacts with teeth upon a click-wheel J², secured upon the spindle A of the spool.

Of course if the drag was arranged on the rotary frame and the cam formed a fixed part over which the drag was moved during its rotation the result would be the same, and I should consider such an arrangement within the spirit of my invention.

It is to be observed that in my improvement the variable drag is arranged upon one end of the reel, while the handle D for rotating the spool is upon the other end of the reel. This arrangement is advantageous because it admits of the free manipulation of the drag without interfering with the movement of the handle.

What I claim as my invention, and desire to secure by Letters Patent, is—

1. In a fishing-reel, the combination, with a spool and reel-heads, of a drag adapted to bear near one of its ends against the spool, and a cam separated from the drag and having its cam-surfaces directly in contact with said drag for forcing the drag against the spool with a variable pressure, substantially as specified.

2. In a fishing-reel, the combination, with a spool and reel-heads, of a drag adapted to bear near one of its ends against the spool, and a cam for forcing said drag against the spool with a variable pressure, said cam being provided with serrations, and said drag being provided with a tooth engaging said serrations, substantially as specified.

3. In a fishing-reel, the combination, with a spool and reel-heads, of a drag adapted to bear near one of its ends against the spool, a rotary frame, a cam on the frame and in contact with the drag, and a hand-piece for rotating said frame, substantially as specified.

4. In a fishing-reel, the combination, with a spool and reel-heads, of drags adapted to bear near one of their ends against the spool, an annular rotary frame F, cams G upon said frame extending in reverse directions and in contact with the drag, and a hand-piece for rotating said frame, substantially as specified.

EDWARD F. PAYNE.

Witnesses:
FREDK. HAYNES,
GEO. BARRY.